US006295151B1

(12) United States Patent
Nagai

(10) Patent No.: US 6,295,151 B1
(45) Date of Patent: Sep. 25, 2001

(54) OPTICAL TRANSMISSION AND RECEIVING EQUIPMENT

(75) Inventor: Masaru Nagai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/075,339

(22) Filed: May 11, 1998

(30) Foreign Application Priority Data

May 13, 1997 (JP) .................................................. 9-137599

(51) Int. Cl.[7] .......................... H04B 10/00; H04B 10/02; H04B 10/04; H04B 10/10
(52) U.S. Cl. .......................... 359/152; 359/161; 359/193; 359/194; 359/153
(58) Field of Search .................................... 359/161, 193, 359/194, 153

(56) References Cited

U.S. PATENT DOCUMENTS 5,504,608 * 4/1996 Neeves .................................. 359/124

FOREIGN PATENT DOCUMENTS

| 61-210920 | 9/1986 | (JP) . |
| 61-61449 Sho | 12/1986 | (JP) . |
| 62-103587 | 5/1987 | (JP) . |
| Hei 6-281813 | 10/1994 | (JP) . |

OTHER PUBLICATIONS

Japanese Office Action dated Dec. 22, Hei 10 with English language translation of Japanese Examiner's comments.

* cited by examiner

Primary Examiner—Jason Chan
Assistant Examiner—Agustin Bello
(74) Attorney, Agent, or Firm—McGuireWoods LLP

(57) ABSTRACT

An optical transmission and receiving equipment to comprises an optical source emitting a laser beam; a optical receiving instrument for receiving that laser beam; an optical filter established between that optical source and optical receiving instrument; a rotary mechanism to change the tilt angle of the optical filter in relation to the laser beam; and a tilt angle controlling instrument for controlling the movement of the rotary mechanism. The tilt angle controlling instrument varies the tilt angle of the optical filter within a prescribed period. Therefore, in the aforementioned optical transmission and receiving equipment P, the transmittance of the laser beam L1 passing through the interference filter 2 is automatically controlled to become the maximum by the control signal based on the received light intensity signal S0 of the optical receiving instrument 3. Consequently, the equipment can use a narrowband bandpass interference filter, which effectively removes background optical noise, without using a special instrument for controlling the temperature of the semiconductor laser.

12 Claims, 7 Drawing Sheets (a)

Output of Oscillator (b)

Output of Light Receiving Instrument (c)

Output of Multiplier (d)

Output of Detector

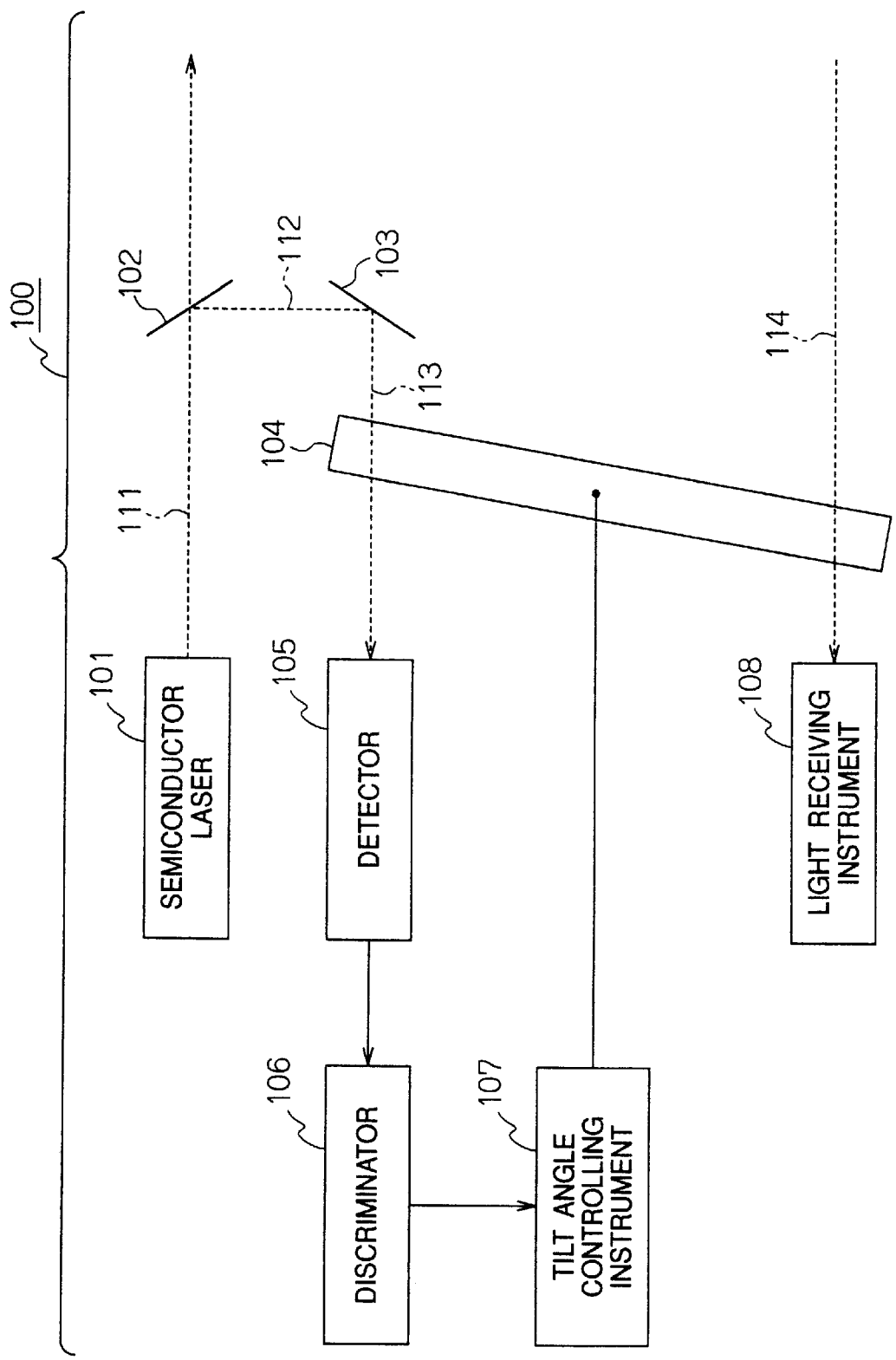

OPTICAL TRANSMISSION AND RECEIVING EQUIPMENT

BACKGROUND OF THE INVENTION

1. Field of the Invention

The present invention is invention relating to an optical transmission and receiving equipment. More particularly, the present invention relates to optical transmission and receiving equipment and a control method thereof, using a semiconductor laser or the like as the optical source, and having an interference filter, for removing so-called background optical noise, interposed between the optical source and optical receiving instrument

2. Description of the Related Art

Before now, optical transmission and receiving equipments using semiconductor lasers were controlled as noted below. Specifically, optical transmission and receiving equipments required a prescribed optical filter for eliminating background optical noise during light transmission and reception. The wavelength of light emitted from the semiconductor laser varies depending on the temperature of the semiconductor laser itself. Consequently, the optical filter needs to be an interference filter with a bandpass broad enough to allow for the variation in laser beam wavelength. However, while optical filters with broad bandpass do transmit laser beams with a broad range of wavelengths, these filters do not eliminate background optical noise effectively. Meanwhile, when using a narrowband bandpass filter, the temperature of the semiconductor laser may be controlled to improve the effective removal of background optical noise, whereby the variation in wavelength of the laser beam, corresponding to the temperature variation, is reduced. However, this requires the addition of means for controlling temperature to the optical transmission and receiving equipments. As a result, the equipments become large and complex and those costs become high.

A prescribed laser radar equipment 100 is disclosed in Japanese Patent Laid-open Publication No. 62-103587. In this publication, it is proposed that this laser radar equipment 100 does not use special means for controlling temperature or the like, but does use a narrowband bandpass interference filter 104, which is very effective in removing background optical noise. As a result, the equipment automatically controls the tilt angle of the aforementioned interference filter 104, so that the transmission of the laser beam transmitted by the interference filter 104 continues to be maximized.

FIG. 7 is a block diagram showing the constitution of the aforementioned laser radar equipment 100. The figure shows an example of the laser radar equipment 100 which varies the tilt angle of the interference filter 104. Moreover, the laser radar equipment 100 is provided an interference filter 104. In the laser beam transmitted by this interference filter 104, the central wavelength (most easily transmitted wavelength), providing the maximum transmission, varies according to the incidence angle of the laser beam. The central wavelength tends to become shorter when the incidence angle of the laser beam in relation to the interference filter 104 increases. The prior art is constituted on the basis of this principle. This is explained here in more detail. As shown in FIG. 7, the laser beam 111 emitted from a semiconductor laser 101 passes through a beam splitter 102 and strikes a target object (not shown). Part of the aforementioned laser beam 111 is reflected by the beam splitter 102 and branched off as a reference beam 112. This branched reference beam 112 is then reflected by a reflecting mirror 103 and becomes the reference laser beam 113. This reference laser beam 113 passes through the interference filter 104 and strikes a detector 105. At this time, the angle of the interference filter 104 in relation to the angled laser beam can be adjusted. Also, a reference information signal detected by the detector 105 is input to a discriminator 106.

The discriminator 106 determines the transmittance of the aforementioned reference laser beam 113 by the interference filter 104 on the basis of the input reference information signal. Then, this discriminator 106 generates a prescribed control signal (angle signal). The control signal is for controlling the tilt angle of the interference filter 104; the control signal is calculated so that the transmittance of the laser beam by the interference filter 104 remains maximized. This control signal is input to a tilt angle controlling instrument 107. The tilt angle controlling instrument 107 rotates the interference filter 104 according to the control signal thus provided. The tilt angle is thereby adjusted so that the transmittance of the laser beam by the interference filter 104 becomes the maximum transmittance.

Meanwhile, the laser beam 114 reflected from the target object passes through the narrowband bandpass interference filter 104, along an optical path parallel to the light path of the reference laser beam 113, and reaches a optical receiving instrument 108. In this way, the reflected laser beam 114 reaches and passes through the interference filter 104 at an incident angle, such that the transmittance by the interference filter 104 is maximized.

In this laser radar equipment 100, temperature change of the semiconductor laser 101 results in a change in the wavelength of the laser beam emitted. When the wavelength of the laser beam deviates from the central wavelength of the interference filter 104, the tilt angle of the interference filter 104 is automatically adjusted by the discriminator 106 and the tilt angle controlling instrument 107. The central wavelength of the interference filter 104 is thereby controlled that the oscillation wavelength of the semiconductor laser 101 falls within the bandpass range of the interference filter 104. Consequently, even though the wavelength of the laser beam varies according to the temperature of the semiconductor laser 101, the maximally transmitted, reflected laser beam 114 reaches the optical receiving instrument 108.

Also, an optical information signal reproduction device is disclosed in Japanese Patent Laid-open Publication No. 61-61449. This optical information signal reproduction device is provided an interference filter, inclined in relation to the optical axis in such a manner that the light transmittance is halfway between the maximum and minimum values, in the light path of the beam reflected from the signal surface in a recording medium. The focus of a converging lens is controlled using a signal attained on the basis of the change in transmittance occurring in the zone between both sides of the optical axis by the divergence and convergence of the light flux reaching the interference filter. At the same time, the optical information signal reproduction device uses a heating and cooling element, which is thermally connected to the semiconductor laser, and controls the wavelength of light from the semiconductor laser, using a signal corresponding to the change in the intensity of transmitted light occurring on the entire surface of the interference filter according to the wavelength variation of the semiconductor laser.

Also, an example of an automatic birefringence meter is disclosed in Japanese Patent Laid-open Publication No. 61-210920. This automatic birefringence meter comprises a polarized light/transmitted light measurement portion which passes light, having little polarization and being output from a laser or monochromatic optical source comprising an interference filter or optical source and spectrometer, through a rotary polarization element to an arbitrary portion of a panel of birefringent material, then passes the transmitted light through a rotation analyzer and measures that light with a photodetector.

However, in the conventional optical transmission and receiving equipment shown in FIG. 7, the angle of the interference filter 104 is adjusted on the basis of a reference beam 112 drawn from a laser beam 111. For this reason, the semiconductor laser 101, interference filter 104, optical receiving instrument 108, and so forth must be arranged together in the same area. Consequently, this conventional equipment cannot be applied to a equipment wherein the semiconductor laser on the transmitting side and the optical receiving instrument on the receiving side are placed in distant locations, such as in an optical transmission equipment, or to a similar optical transmission system.

Also, in the conventional optical transmission and receiving equipment shown in FIG. 7, part of the laser beam 111 is removed as the reference beam 112, then reflected, and then transmitted by the interference filter 104 as the reference laser beam 113. At the same time, the laser beam 114 reflected from the target object travels along a path parallel to the transmission path of the reference laser beam 113, and is transmitted by the interference filter 104. For this reason, the position of each element and the optical axis and so forth must be established with great precision. The degree of freedom in the constitution of the device is strictly limited and the equipment is therefore difficult to build.

SUMMARY OF THE INVENTION

It is an object of the present invention to provide an optical transmission and receiving equipment which can use a narrowband bandpass interference filter, which is effective in removing background optical noise, without using means for controlling temperature, and which can be used without hindrance in the case of establishing the semiconductor laser on the transmission side at some distance from the optical receiving instrument on the reception side. It is another object of the present invention to provide an optical transmission and receiving equipment having a great degree of freedom in the structure of the equipment and which can be easily manufactured. In order to achieve the aforementioned objects, the optical transmission and receiving equipment relating to the present invention is provided the following:

(a) an optical source for emitting a laser beam;
(b) an optical receiving instrument for receiving that laser beam;
(c) an optical filter established between that optical source and optical receiving instrument;
(d) a rotating mechanism to change the tilt angle of the optical filter in relation to the laser beam; and
(e) a tilt angle controlling instrument for controlling the movement of the rotary mechanism; wherein the tilt angle controlling instrument varies the tilt angle of the optical filter within a prescribed period.

The tilt angle controlling instrument comprises an oscillator, a multiplier for multiplying the output of the oscillator and the output of the optical receiving instrument, a differential amplifier for comparing the multiplication signal from this multiplier to the standard voltage and amplifying the difference thereof, and a driving circuit for superimposing the amplified output of the differential amplifier and the oscillation signal of the oscillator and providing operating instructions to the rotary mechanism. Also, the oscillation signal from the oscillator is input to the driving circuit; as a result, a predetermined dither s provided to the interference filter. In this way, the signal superimposed on the oscillation signal is input to the driving circuit; the tilt angle of the interference filter is thereby varied at a prescribed frequency. Consequently, when the wavelength of the laser beam deviates from the central wavelength of the interference filter, a signal corresponding to the frequency of the oscillator is detected by the optical receiving instrument. As a result, the tilt angle of the interference filter is controlled so that the optical receiving instrument attains constant output; the transmission intensity of the laser beam passing through the interference filter can thereby remain maximized.

BRIEF DESCRIPTION OF THE DRAWINGS

FIG. 2(*a*) shows the characteristics of transmission in the case that the wavelength of the semiconductor laser beam is less than the central wavelength of the interference filter; FIG. 2(*b*) shows the case that the wavelengths are equal; and FIG. 2(*c*) shows the case where the wavelength of the laser beam is longer.

FIG. 7 is a block diagram showing the prior art.

DESCRIPTION OF THE PREFERRED EMBODIMENTS

Figure 1:
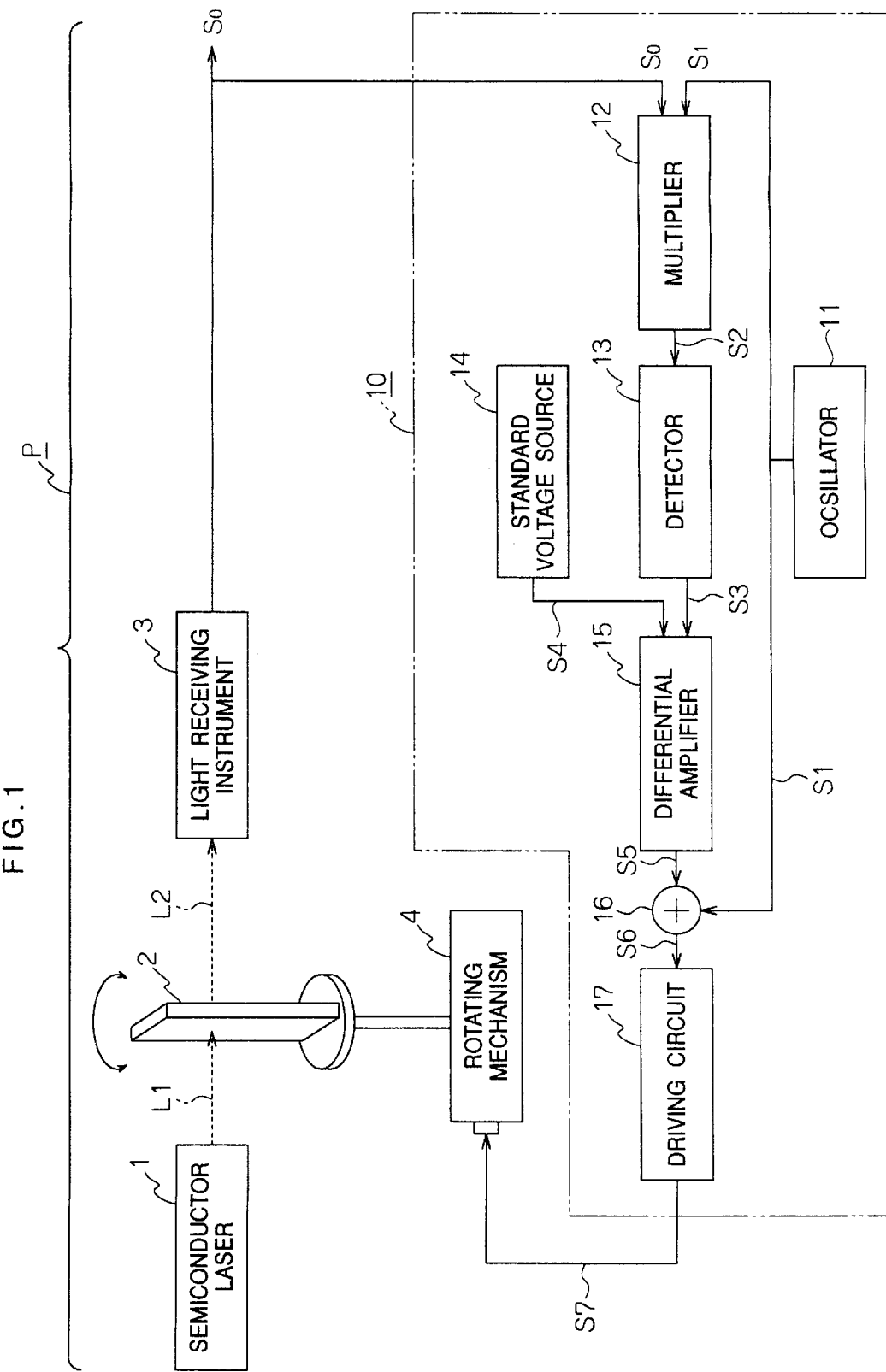
FIG. 1 is a block diagram showing the constitution of the optical transmission and receiving equipment relating to an embodiment of the present invention.

FIG. 1 is a block diagram showing the constitution of the optical transmission and receiving equipment P relating to a first embodiment of the present invention. The optical transmission and receiving equipment P shown in FIG. 1 includes a semiconductor laser 1 as a optical source for emitting laser beams, an interference filter 2 for removing background optical noise and transmitting the laser beam emitted from the semiconductor laser 1, and an optical receiving instrument 3 for receiving the laser beam transmitted by the interference filter 2. Also, in order to change the incident angle of the laser beam on the interference filter 2, the optical transmission and receiving equipment P is provided a rotary mechanism 4, as angle adjustment means, for adjusting the tilt angle of the interference filter 2 itself in relation to the laser beam. Furthermore, the optical transmission and receiving equipment P is provided with a tilt angle controlling instrument for controlling this rotary mechanism 4. The tilt angle controlling instrument 10 controls the rotary mechanism 4 so that the transmittance of the laser beam through the interference filter 2 is maximized.

The tilt angle controlling instrument 10 comprises an oscillator 11, a multiplier 12 as means for multiplying the oscillation signal of the oscillator 11 and the optical intensity signal of the optical receiving instrument 3, and a detector 13 for detecting the multiplier signal from multiplier 12. Also, the tilt angle controlling instrument 10 is provided a standard voltage source 14 for producing a standard voltage and a differential amplifier 15 for comparing the output of the detector 13 with the standard voltage produced by the standard voltage source 14 and amplifying the difference thereof. Furthermore, the tilt angle controlling instrument 10 includes an adder 16 for adding the amplified signal of the differential amplifier 15 to the oscillation signal of the oscillator 11, and a driving circuit 17 for supplying the addition signal from this adder 16 to the rotary mechanism 4. Moreover, the adder 16 and driving circuit 17 constitute operating means for combining the amplified signal of the differential amplifier 15 with the oscillation signal from the oscillator 11 and providing operating instructions to the rotary mechanism 4 which is a means for adjusting the angle.

The optical transmission and receiving equipment P in the present embodiment, which is constituted as noted above, operates and functions as follows. The laser beam L1 emitted by the semiconductor laser 1 passes through the interference filter 2, becomes the transmitted beam L2, and is received by the optical receiving instrument 3. The transmitted beam L2 received by the optical receiving instrument 3 is converted to a received light intensity signal S0 and output. Part of the received light intensity signal S0 is input to one input terminal of the multiplier 12. The oscillation signal S1 from the oscillator 11 is supplied to the other input terminal of the multiplier 12. This oscillation signal is a small alternating signal. Consequently, the received optical intensity signal S0 from the optical receiving instrument 3 and the oscillation signal S1 from the oscillator 11 are multiplied by the multiplier 12. The multiplication signal S2, showing the product of the received optical intensity signal S0 and oscillation signal S1 multiplied by the multiplier 12, is input to the detector 13.

The multiplication signal S2 input to the detector 13 is detected thereby; the detected signal S3 is input to one input terminal of the differential amplifier 15. The standard voltage S4 from the standard voltage source 14 is applied to the other input terminal of the differential amplifier 15. Consequently, the difference between the detected signal S3 from the detector 13 and the standard voltage S4 from the standard voltage source 14 is amplified in the differential amplifier 15 and the amplified signal S5 is output to the adder 16.

The amplified signal S5 from the differential amplifier 15 and the oscillation signal S1 from the oscillator 11 are added (superimposed) in the adder 16 and become the addition signal S6. This addition signal S6 is supplied to the driving circuit 17. The driving circuit 17 produces a driving signal S7, corresponding to the addition signal S6 supplied thereto, and provides this driving signal S7 as operating instructions to the rotary mechanism 4. The rotary mechanism 4 operates according to the driving signal S7 provided by the driving circuit 17, rotates the interference filter 3 to the prescribed angle, and causes the variation of incident angle of the laser beam L1 on the interference filter 2.

Figure 2:
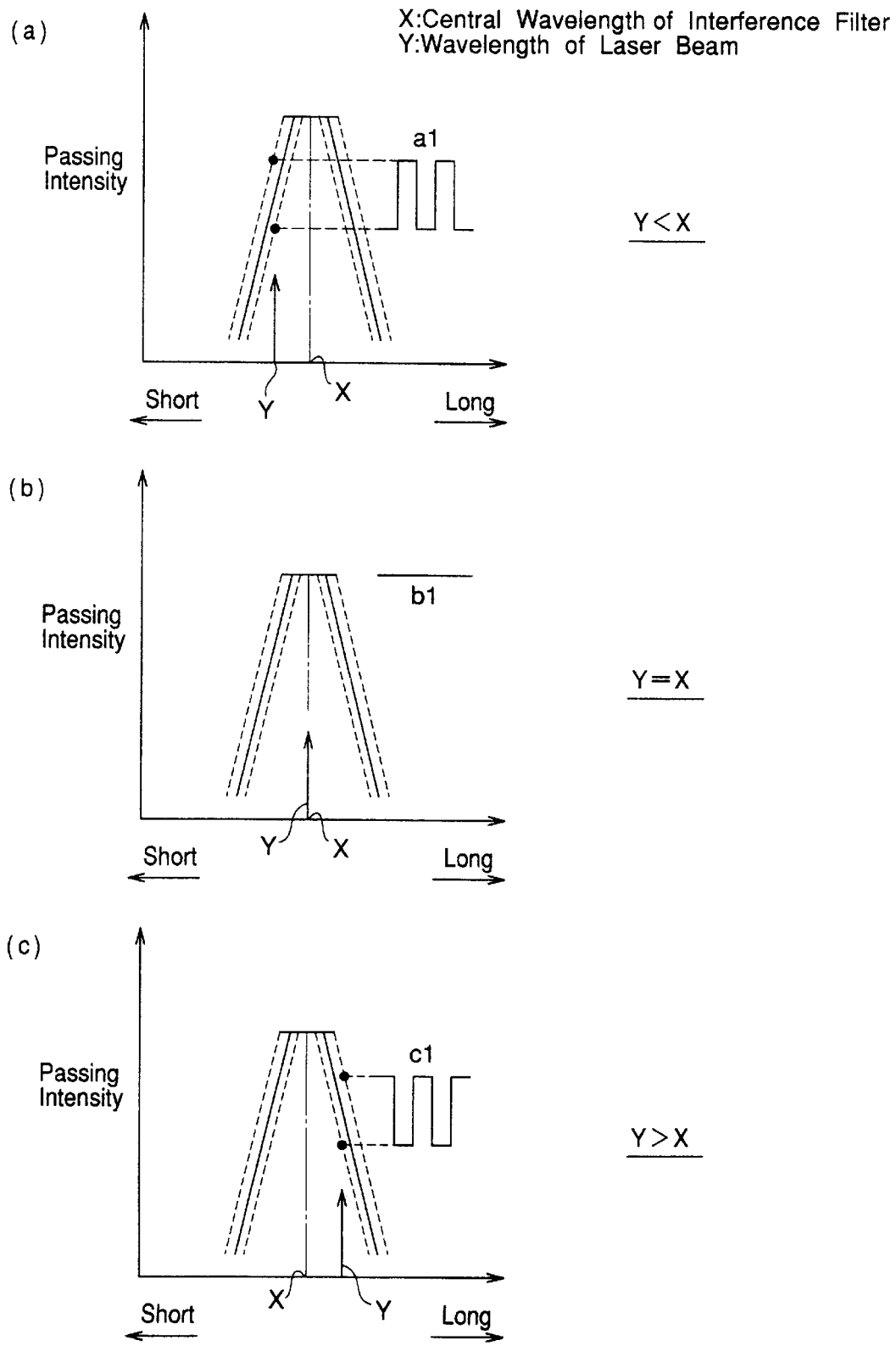
FIG. 2 is a diagram showing the operation of the optical transmission and receiving equipment shown in FIG. 1.

FIG. 2 shows the change in the intensity of the transmitted beam L2 received by the optical receiving instrument 3, corresponding to the wavelength and incident angle of the laser beam L1 in relation to the interference filter 2. FIG. 2(a) shows the case where the wavelength Y of the laser beam L1 is shorter than the central wavelength X of the interference filter 2. FIG. 2(b) shows the case where the wavelength Y of the laser beam L1 is equal to the central wavelength of the interference filter 2. FIG. 2(c) shows the case where the wavelength Y of the laser beam L1 is greater than the central wavelength X of the interference filter 2.

Moreover, as shown in FIG. 2, the distribution of laser beam transmission by the interference filter 2 is in the form of a mesa with the central wavelength X at the center. Specifically, the laser beam L1 is transmitted with maximum intensity, if the central wavelength X of the interference filter 2 at that time agrees with the actual wavelength Y of the laser beam L1, when the interference filter 2 is tilted at a prescribed angle. However, the transmission intensity decreases when the wavelength Y of the laser beam L1 deviates from the central wavelength X of the interference filter 2.

A small dither is provided from the oscillator 11 to the interference filter 2, by the oscillation signal S1, by means of the adder 16, driving circuit 17, and rotary mechanism 4. For this reason, the interference filter 2 oscillates at a prescribed frequency and the angle shown in each part of FIG. 2 varies at a uniform amplitude. As a result, the intensity of the laser beam L1 actually passing through the interference filter 2 normally varies, even when the laser beam L1 of the same wavelength is transmitted. In FIG. 2, the double dotted lines show the properties of transmission intensity due to dither.

In FIG. 2, the received light intensity signal S0 output from the optical receiving instrument 3 is in phase with the oscillation signal S1 from the oscillator 11, when the wavelength Y of the laser beam L1 is shorter than the central wavelength X of the interference filter 2. Also, the phase is 180° different from that of the oscillation signal S1 when [1] is greater than the central wavelength X. This aspect is explained below.

As shown in FIG. 2(a), the signal S0 changes as shown by a1 when the wavelength Y of the laser beam L1 is shorter than the central wavelength X of the interference filter 2. Also, as shown in FIG. 2(b), the signal S0 does not vary, as shown by b1, when the wavelength Y of the laser beam L1 is equal to the central wavelength X of the interference filter 2. Furthermore, as shown in FIG. 2(c), the received light intensity signal S0 varies as shown by C1 when the wavelength Y of the laser beam L1 is longer than the central wavelength X of the interference filter 2. FIGS. 3(a)–(d) are figures showing the signal waveform from each portion in the case where the wavelength Y of the laser beam L1 from the semiconductor laser 1 is shorter than the central wavelength X of the interference filter 2. Also, FIGS. 4(a)–(d) are figures showing the signal waveform from each portion in the case where the wavelength Y of the laser beam L1 from the semiconductor laser 1 is equal to the central wavelength X of the interference filter 2. FIGS. 5(a)–(d) are figures showing the signal waveform from each portion in the case where the wavelength Y of the laser beam L1 from the semiconductor laser 1 is greater than the central wavelength X of the interference filter 2.

Figure 3:
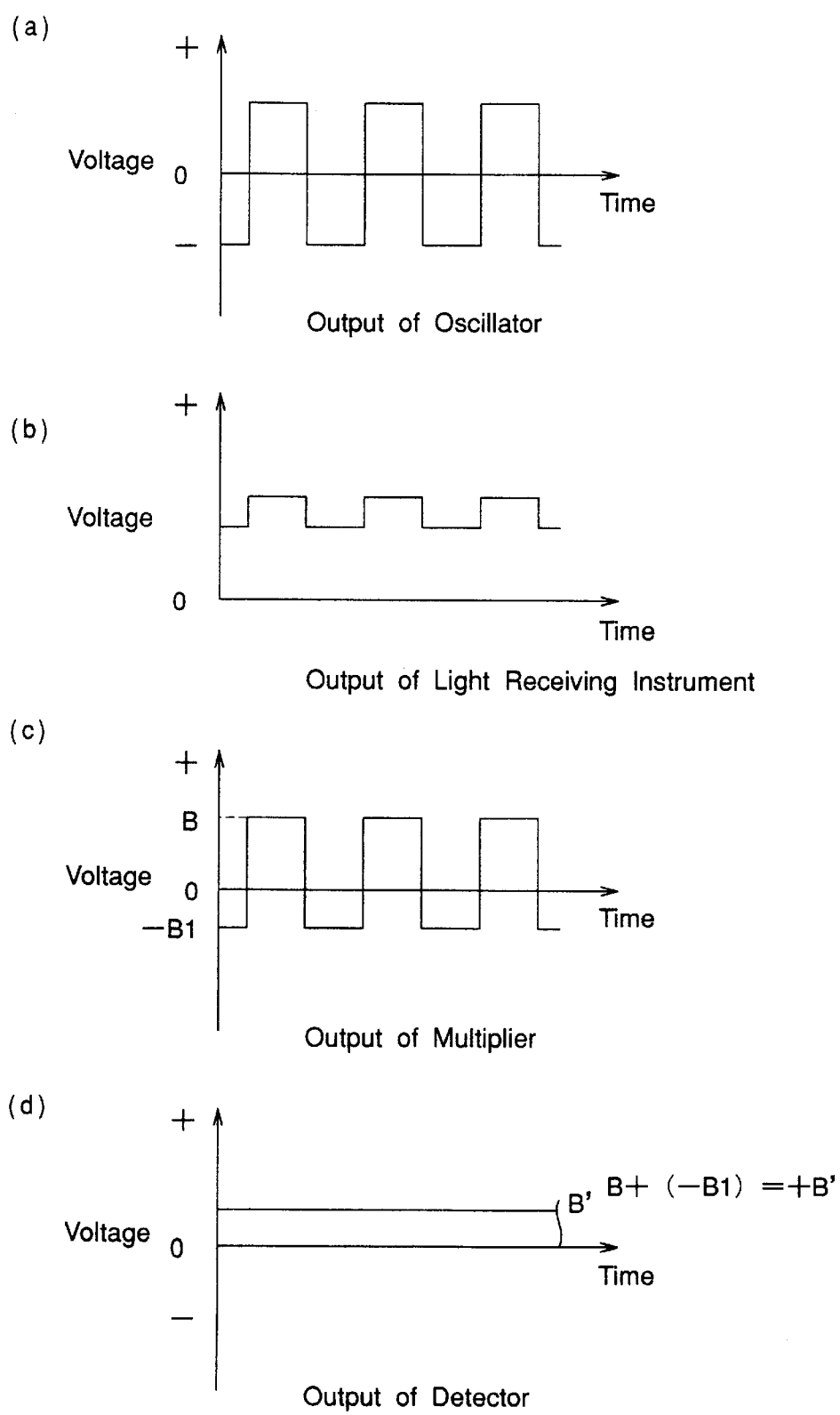
FIG. 3 is a diagram showing the action of each element of the optical transmission and receiving equipment shown in FIG. 1; this is a waveform diagram for the output signal from each portion in the case where the wavelength of the semiconductor laser beam is shorter than the central wavelength of the interference filter.
Figure 4:
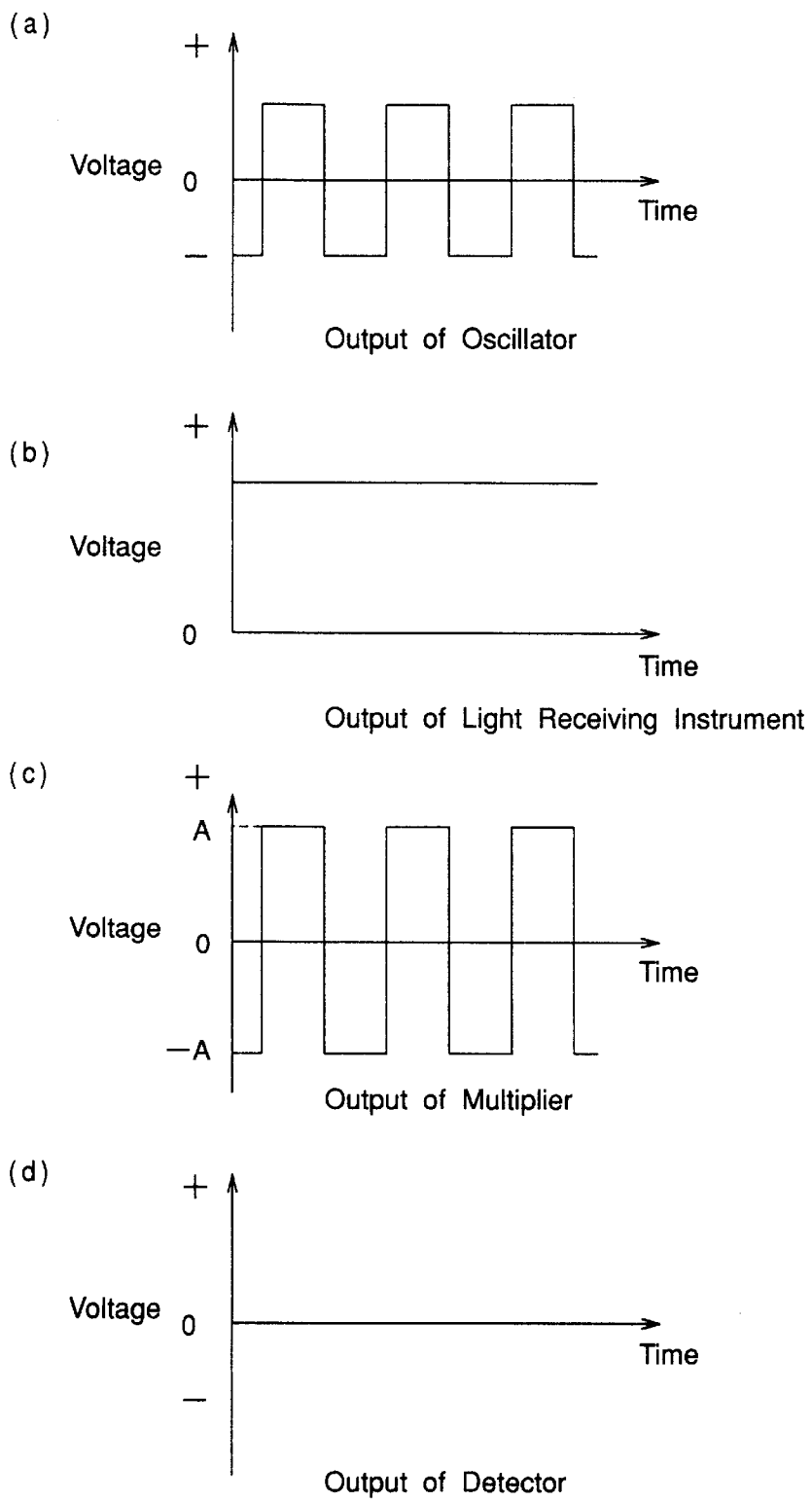
FIG. 4 is a diagram showing the action of each element of the optical transmission and receiving equipment shown in FIG. 1; this is a waveform diagram for the output signal from each portion in the case where the wavelength of the semiconductor laser beam is equal to the central wavelength of the interference filter.
Figure 5:
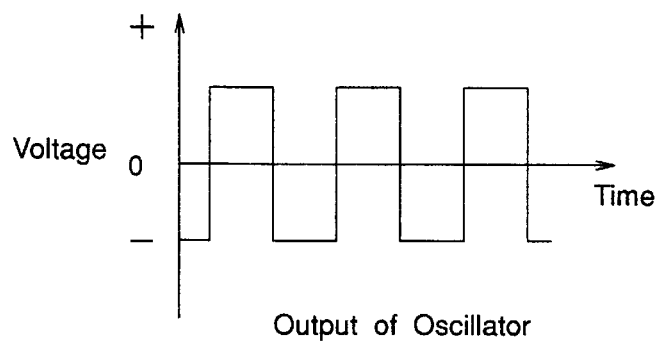
FIG. 5 is a diagram showing the action of each element of the optical transmission and receiving equipment shown in FIG. 1; this is a waveform diagram for the output signal from each portion in the case where the wavelength of the semiconductor laser beam is longer than the central wavelength of the interference filter.
Figure 5:
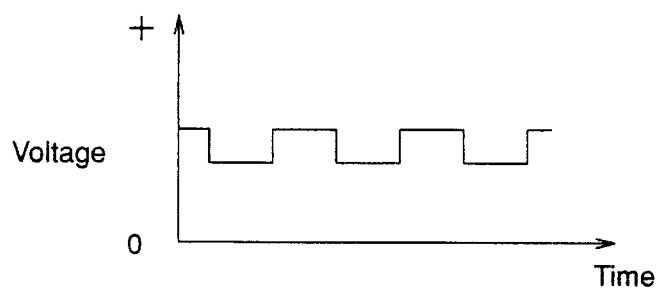
Figure 5:
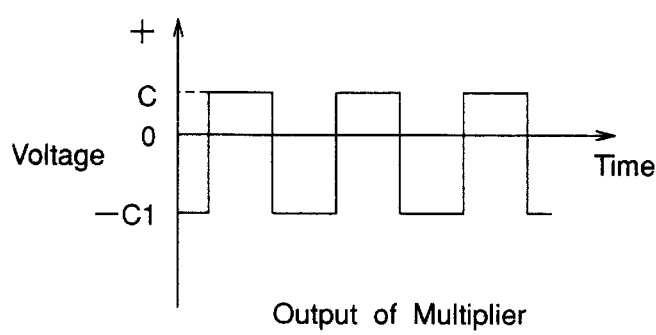
Figure 5:
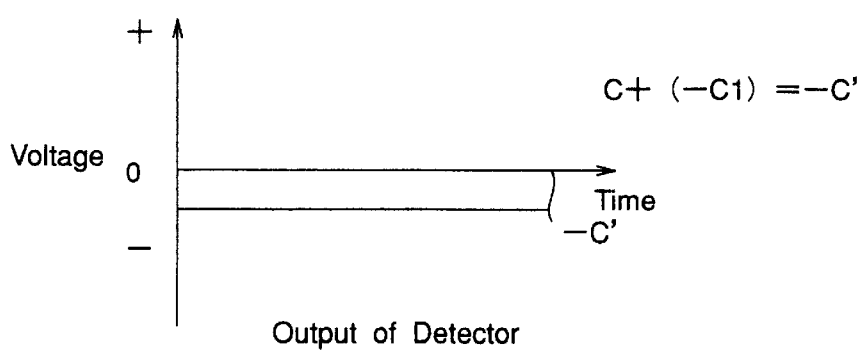

The signals shown in FIG. 3(b), FIG. 4(b), and FIG. 5(b) correspond to signals a1, b1, and c1 shown in FIG. 2. For example, FIG. 3(b) shows the waveform of the received light intensity signal S0 from the optical receiving instrument 3, as noted above, when the wavelength Y of the laser beam L1 from the semiconductor laser 1 is shorter than the central wavelength X of the interference filter 2. Consequently, as shown in FIG. 2(a), the tilt angle itself of the interference filter 2 varies, as well as the incident angle of the laser beam L1, even if the wavelength of the laser beam L1 is constant. Moreover, the frequency of the waveform of the received light intensity signal S0 of the optical receiving instrument 3 naturally agrees with the frequency of the oscillator 11. Meanwhile, FIG. 4(b) shows the case where the wavelength Y of the laser beam L1 from the semiconductor laser 1 agrees with the central wavelength X of the interference filter 2. As noted above, the interference filter 2 vibrates slightly. However, when the wavelength Y of the laser beam L1 agrees with the central wavelength X of the interference filter 2, the laser beam L1 is transmitted at a constant intensity regardless of the vibration of the interference filter 2. Consequently, the waveform of the received light intensity signal S0 from the optical receiving instrument 3 becomes a constant value, as shown in FIG. 4(b).

Furthermore, FIG. 5(b) shows the waveform of the received light intensity signal S0 from the optical receiving instrument 3, in the case where the wavelength Y of the laser beam L1 from the semiconductor laser 1 is greater than the central wavelength X of the interference filter 2. As shown in FIG. 2(c), the tilt angle itself of the interference filter 2 varies, even though the wavelength of the laser beam L1 is constant, and the incidence angle of the laser beam L1 also varies. This results in the waveform of the received light intensity signal S0 of the optical receiving instrument 3 varying as shown in FIG. 5(b).

The product of the signal S0 output from the optical receiving instrument and the oscillation signal S1 output from the oscillator 11 is calculated by the multiplier 12. The multiplication signal S2 of the multiplier 12 is shown in FIG. 3(c), FIG. 4(c), and FIG. 5(c).

In other words, as shown in FIG. 4(c), the waveform of the multiplication signal S2 of the multiplier 12 is positive and negative and has the maximum and minimum values of A and −A respectively, when the wavelength Y of the laser beam L1 is equal to the central wavelength X. Meanwhile, as shown in FIG. 3(c), the waveform of the multiplication signal S2 of the multiplier 12 has the maximum value of B and the minimum value of −B1, when the wavelength Y of the laser beam L1 is less than the central wavelength X. A comparison of absolute values shows that B is greater than B1. As shown in FIG. 5(c), the waveform of the multiplication signal S2 of the multiplier 12 has the maximum value of C and the minimum value of −C1, when the wavelength Y of the laser beam L1 is greater than the central wavelength X. A comparison of absolute values at this time shows that C1 is greater than C.

The detection signal S3 from the detector 13 becomes as shown in FIG. 3(d), FIG. 4(d), and FIG. 5(d), respectively. As shown in the figures, the detection signal S3] becomes positive when the wavelength Y of the laser beam L1 is shorter than the central wavelength X of the interference filter 2, zero when the wavelength Y of the laser beam L1 is equal to the central wavelength X, and negative when the wavelength Y of the laser beam L1 is greater than the central wavelength X.

Consequently, in the present embodiment, the detection signal S3 of the detector 13 changes between positive or negative, with the boundary being the case where the wavelength Y of the laser beam L1 is equal to the central wavelength X of the interference filter 2. The change in wavelength of the laser beam L1 can be found by monitoring the signal S3 output from the detector 13. The tilt angle of the interference filter 2 can therefore be controlled so that the wavelength Y of the laser beam L1 agrees with the central wavelength X of the interference filter 2.

Figure 6:
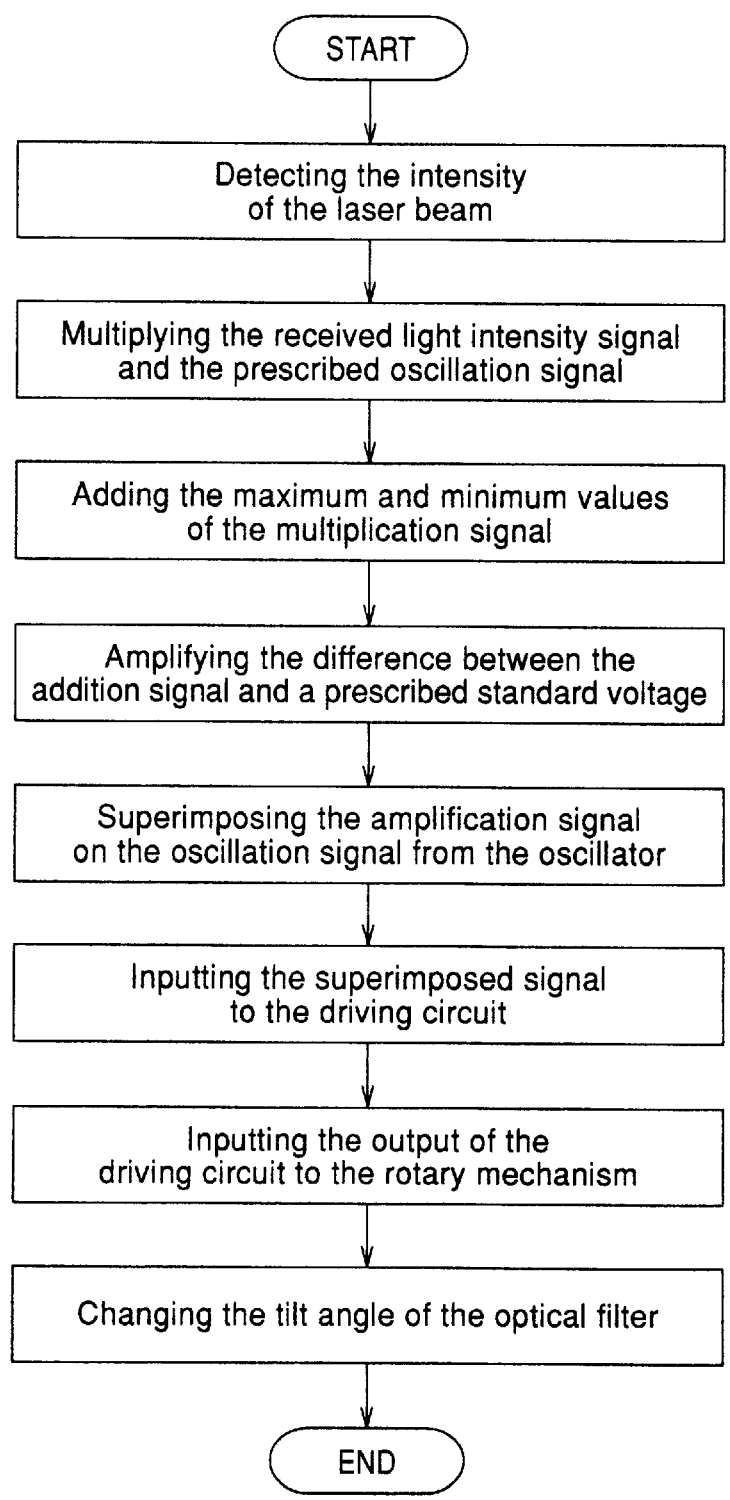
FIG. 6 is a flow chart showing the method for controlling the optical transmission and receiving equipment relating to the present invention.

As discussed above, the optical transmission and receiving equipment P shown in the embodiment of the present invention is provided:

a semiconductor laser 1 for emitting a laser beam L1; a optical receiving instrument 3 for receiving the laser beam L1 emitted from the semiconductor laser 1;

an interference filter 2 for removing background optical noise and which is interposed between the optical receiving instrument 3 and semiconductor laser 1;

a rotary mechanism 4 for adjusting the tilt angle of the interference filter 2 in order to change the incident angle at which the laser beam L1 strikes the interference filter 2; and a tilt angle controlling instrument 10 for controlling the rotary mechanism 4 on the basis of the light intensity signal output from the optical receiving instrument 3. FIG. 6 is a flow chart showing the method for controlling the optical transmission and receiving equipment, which is provided an optical filter established between an optical receiving instrument and optical source for outputting a laser beam. This method comprises the following steps.

detecting the intensity of the laser beam with the optical receiving instrument;

multiplying the received light intensity signal of the optical receiving instrument and the prescribed oscillation signal from the oscillator; and adding the maximum and minimum values of the multiplication signal.

This control method further comprises the steps of:

amplifying the difference between the addition signal attained by addition and a prescribed standard voltage;

superimposing the amplification signal attained by amplification on the oscillation signal from the oscillator;

inputting the superimposed signal attained by superimposing to the driving circuit; and inputting the output of the driving circuit to the rotary mechanism and changing the tilt angle of the optical filter.

In the aforementioned optical transmission and receiving equipment P, the transmittance of the laser beam L1 passing through the interference filter 2 is automatically controlled to become the maximum by the control signal based on the received light intensity signal S0 of the optical receiving instrument 3. Consequently, the device can use a narrow-band bandpass interference filter, which effectively removes background optical noise, without using a special instrument for controlling the temperature. Moreover, in the device relating to the present invention, the semiconductor laser 1 and optical receiving instrument 3 do not need to be established in the same area and may instead be located at separate positions. This is different from a device constituted so that part of the laser beam output from the semiconductor laser 1 is separated as a reference beam, the filter tilt angle is controlled, so that the transmittance of the interference filter 2 is maximized on the basis of the reference beam, and the laser beam reflected from the target object passes through the interference filter 2. For this reason, the present invention can be applied without hindrance to a system or equipment wherein the semiconductor laser on the transmission side and the optical receiving instrument on the reception side are established at separate locations, such as in an optical transmission system.

Also, the tilt angle controlling instrument 10 comprises:
an oscillator 11;
multiplying means 12 for multiplying the oscillation signal S1 from the oscillator 11 with the received light intensity signal S0 from the optical receiving instrument 3;
differential amplifying means 15 for comparing the output S2 of the multiplying means 12 with a standard voltage S4 and amplifying the difference therebetween; and
a driving circuit 17 for combining the output S5 from the differential amplifying means 15 with the oscillation signal S1 from the oscillator 11 and providing operating instructions to the rotary mechanism 4.

The tilt angle controlling instrument 10 is constituted of dedicated electrical circuits and the elements thereof need no highly precise optical positioning. No positioning is necessary so that a reference beam drawn from the laser beam output by the semiconductor laser and a laser beam reflected from the target object pass in parallel through the interference filter. Therefore, the structure of this equipment has a sufficient degree of freedom and can be easily manufactured.

The invention may be embodied in other specific forms without departing from the spirit or essential characteristic thereof. The present embodiments is therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 9-137599 (Filed on May 13, 1997) including specification, claims, drawings and summary are incorporated herein by reference in its entirety.

What is claimed is:

1. An optical transmission and receiving system, comprising:
   (a) an optical source emitting a laser beam;
   (b) an optical receiving instrument;
   (c) an optical filter established between that optical source and optical receiving instrument, wherein the optical receiving instrument converts a beam output from the optical filter into a light signal;
   (d) a rotating mechanism to change a tilt angle of the optical filter in relation to the laser beam; and
   (e) a tilt angle controlling instrument which controls movement of the rotating mechanism, wherein the tilt angle controlling instrument varies the tilt angle of the optical filter within a prescribed period based on the light signal output from the optical receiving instrument, and
   wherein the tilt angle controlling instrument includes:
      an oscillator which outputs a prescribed oscillation signal;
      a multiplier which multiplies the oscillation signal of the oscillator and the light signal received from the optical receiving instrument;
      a differential amplifier which compares the multiplication signal from the multiplier to a standard voltage and which amplifies the difference thereof;
      an adder which superimposes and outputs the amplified signal from the differential amplifier and the oscillation signal of the oscillator; and
      a driving circuit which generates a control signal from the addition signal of the adder and which provides the control signal to the rotating mechanism.

2. The optical transmission and receiving system according to claim 1, wherein the tilt angle controlling instrument controls action of the rotating mechanism so that the light signal from the optical receiving instrument is maximized.

3. The optical transmission and receiving system according to claim 1, wherein said light signal is a light intensity signal.

4. The optical transmission and receiving system according to claim 3, wherein said tilt angle controlling instrument varies the tilt angle of the optical filter based on a degree to which the light intensity signal output from said optical receiving instrument varies from a desired light intensity.

5. The optical transmission and receiving system according to claim 1 wherein the optical filter is an interference filter.

6. The optical transmission and receiving system to claim 1 wherein the optical source is a semiconductor laser.

7. The optical transmission and receiving system according to claim 1 which further comprises a detector, installed between the multiplier and differential amplifier, for calculating the sum of the maximum value and minimum value of the multiplication signal of the multiplier.

8. The optical transmission and receiving system to claim 7 wherein the tilt angle controlling instrument controls the tilt angle of the optical filter so the output of the detector becomes zero.

9. The optical transmission and receiving system according to claim 1 which further comprises a standard voltage source for applying a prescribed standard voltage to the differential amplifier.

10. The optical transmission and receiving system according to claim 9 wherein the standard voltage source applies a constant voltage to the differential amplifier.

11. The optical transmission and receiving system according to claim 4, wherein said desired light intensity corresponds to a central wavelength of said interference filter, said tilt angle controlling instrument varying the tilt angle so that the wavelength of the laser beam corresponds to the central wavelength of the interference filter to thereby cause the beam through the filter to be output at maximum intensity.

12. A method for controlling optical transmission and receiving equipment, which includes an optical filter established between an optical source for outputting laser beams and an optical receiving instrument, comprising the steps of:
   (a) detecting an intensity of a laser beam output from said optical filter with the optical receiving instrument;
   (b) multiplying the received light intensity signal of the optical receiving instrument and a prescribed oscillation signal to form a multiplication signal;
   (c) adding maximum and minimum values of the multiplication signal to form an addition signal;
   (d) amplifying a difference between the addition signal and a prescribed standard voltage to form an amplification signal;
   (e) superimposing the amplification signal on the oscillation signal to form a superimposed signal;
   (f) inputting the superimposed signal to a driving circuit; and
   (g) inputting an output of the driving circuit to a rotating mechanism and changing a tilt angle of the optical filter based on said output.

* * * * *